United States Patent
Di Pietro et al.

[11] Patent Number: 5,867,813
[45] Date of Patent: Feb. 2, 1999

[54] METHOD AND APPARATUS FOR AUTOMATICALLY AND REPRODUCIBLY RATING THE TRANSMISSION QUALITY OF A SPEECH TRANSMISSION SYSTEM

[75] Inventors: Gianni Di Pietro, Solothurn; Ziemowit Zglinski, Zuchwil, both of Switzerland

[73] Assignee: Ascom Infrasys AG., Solothurn, Switzerland

[21] Appl. No.: 431,414

[22] Filed: May 1, 1995

[51] Int. Cl.$^6$ ............................. G10L 9/18; H04B 17/00
[52] U.S. Cl. ........................ 704/202; 704/228; 704/233; 706/25
[58] Field of Search .................................. 395/2.11, 2.14, 395/2.37, 2.42, 2.47, 2.48, 2.79, 23; 704/202, 205, 228, 232.3, 238, 239, 270; 706/25

[56] References Cited

U.S. PATENT DOCUMENTS

| | | | |
|---|---|---|---|
| 4,860,360 | 8/1989 | Boggs | 704/233 |
| 5,040,215 | 8/1991 | Amano et al. | 704/232 |
| 5,220,640 | 6/1993 | Frank | 704/202 |
| 5,715,372 | 2/1998 | Meyers et al. | 706/16 |

FOREIGN PATENT DOCUMENTS

| | | | |
|---|---|---|---|
| 0114463 | 8/1984 | European Pat. Off. | H04B 17/00 |
| 114463 | 8/1994 | European Pat. Off. | H04B 17/00 |
| 722164A1 | 7/1996 | European Pat. Off. | G10L 5/06 |
| 3513361 | 10/1986 | Germany | H04B 17/00 |
| 3708002 | 9/1988 | Germany | H04B 17/00 |
| 1455712 | 11/1976 | United Kingdom | G01R 29/26 |
| 9400922 | 1/1994 | WIPO | H04B 3/46 |

OTHER PUBLICATIONS

John G. Beerends and Jan A. Stemerdink, "Measuring the Quality of Audio Devices", preprint 3070 (L–8), 90th Convention of the Audio Engineering Society, Paris, pp. 1–10, Feb. 1991.

Hiroshi Irii, Keita Kurashima, Nobuhiko Kitawaki, and Kenzo Itoh, "Objective Measurement Method for Estimating Speech Quality of Low–Bit Rate Speech Coding", NTT Review, vol. 3, No. 5, pp. 79–87, Sep. 1991.

Spiros Dimolitsas, "Objective Speech Distortion Measures and their Relevance to Speech Quality Assessments", IEE Proceedings, vol. 136, Pt. 1, No. 5, pp. 317–324, Oct. 1989.

Jurgen Herre, Ernst Eberlein, Hartmut Schott, and Christian Schmidmer, "Analysis Tool for Realtime Measurements Using Perceptual Criteria", Proceedings of the AES 11th International Conference, pp. 180–190, May 1992.

Michael P. Hollier, M. O. Hawksford, and D. R. Guard, "Error Activity and Error Entropy as a Measure of Psychoacoustic Significance in the Perceptual Domain", IEE Proc.–Vis. Image Signal Processing, vol. 141, No. 3, pp. 203–208, Jun. 1994.

Chuen Chien Lee, "Fuzzy Logic in Control Systems: Fuzzy Logic Controller", IEEE Trans. Systems, Man, and Cybernetics, vol. 20, No. 2, pp. 404–418 (pt.I) and pp. 419–435 (pt.II), Mar. 1990.

(List continued on next page.)

*Primary Examiner*—David R. Hudspeth
*Assistant Examiner*—Télivaldis Ivars Šmits

[57] ABSTRACT

A recorded voice test signal is transmitted from a transmitting end of a mobile communication system, and in a test unit at the receiving end a frame generator is synchronized with the received signal. Each frame of the signal is evaluated in computing circuits on the outputs of the frame generator, which calculate characteristic values of each frame which are then subtracted from calculated characteristic reference values of the frames stored in a memory. The differences between these characteristic values are fed to a neural network which classifies the quality of the difference signals as Good, Medium and Bad, and a defuzzyfication logic circuit further refines the quality classification output, whereby the transmission quality throughout the mobile communication system can be reprodicbly rated for a system quality rating.

10 Claims, 4 Drawing Sheets

OTHER PUBLICATIONS

Herre et al., "Analysis Tool for Realtime Measurements Using Perceptual Criteria", AES 11th International Conference, pp. 180–190, May 29, 1992.

S. Dimolitsas, "Objective speech distortion measures and their relevance to speech quality assessments", IEE Proceedings, vol. 136, Part I, No. 5, Oct. 1989.

Kitawaki et al., "Quality Assessment of Speech Coding and Speech Synthesis Systems", I.E.E.E., Oct. 26, 1988, No. 10, New York, NY.

AGEN Mitteilungen No. 52, Nov. 1990, Automatic Speech Recognition by Arthur Schaub.

"Speech Communication—Human and Machine", by Douglas O'Shaugnessy, Addison–Wesley, 1987.

METHOD AND APPARATUS FOR AUTOMATICALLY AND REPRODUCIBLY RATING THE TRANSMISSION QUALITY OF A SPEECH TRANSMISSION SYSTEM

BACKGROUND OF THE INVENTION

In mobile radio communication networks and particularly in digital networks (such as GSM) the quality of transmission can vary within a wide range depending on the location (distance to the next base station), the travelling speed and the environment (buildings, mountains etc.) of the mobile station at a certain instant. It is important for the operator of such networks to know where the reception quality is unsatisfactory in order to be able to improve the network by appropriate measures.

So far there are known two types of methods for checking the transmission quality of mobile telephone systems: One can be qualified as "manual" method and the other as "automatic" method. In the "manual" method an expert is driving a car through the area to be assessed while listening e. g. to the news transmitted via the mobile communication system. The expert is continuously writing down his opinion on the quality of reception. E. g. he classifies the reception quality—on the basis of his experience—into different rating classes such as "good", "acceptable" and "bad". It is evident that the results of this method are not reproducible. Various experts have different assessments even under similar conditions. Even if the same expert drives along the same route at different times, the results may differ and it is not possible to determine, whether the difference was just in the assessment or whether it was in the actual transmission quality.

The "automatic" method is based on the fact that e. g. the bit error rate of digital transmissions is a known and measurable quantity. The error rate is therefore used for rating the transmission quality. Tests have shown that the bit error rate and the audible transmission quality (in the sense of the intelligibility of a transmitted sentence) often do not correlate: The bit error rate may be acceptable or good, whereas the intelligibility is bad and vice versa. The bit error rate assessment is only viable for a digital transmission system. An analog speech transmission cannot be rated by this method.

There are other automatic methods for determining the transmission quality of a channel. GB-1 455 712 e. g. teaches comparing the input and the output signal of the system and determining some sort of quality according to the signal difference. A definition of the quality is not disclosed. The prior art document EP-0 114 463 teaches transmitting a plurality of tone signals, digitizing the received signal and determining the Fourier transform of the tone signals in order to determine the transmission quality.

The problem of the known techniques for rating the transmission quality is, that the basical correlation between the transmission quality of a specific physical or software parameter (tone signal, error signal, bit error rate etc.) and the rating done by a test person is unsatisfactory.

SUMMARY OF THE INVENTION

It is an object of the invention to provide a method and an apparatus for automatically and reproducibly rating the transmission quality of a speech transmission system systematically leading to a quality rating that is similar in its result to that done by a test person (human expert).

It is a further object of the invention to provide a rating method specifically adapted for classifying the quality of speech transmission channels.

According to the invention, the method comprises the steps of:

a) Generating a test signal containing a predetermined recorded voice signal;

b) transmitting the test signal by the speech transmission system from a transmitting end to a receiving end;

c) extracting characteristic values from the received test signal;

d) determining a differential pattern corresponding to the difference between the characteristic values and predetermined reference values;

e) feeding the differential pattern to a neural network that has been trained for classifying patterns according to a number of predetermined transmission quality classes.

The invention does not use a signal that is prima facie easy to detect and to analyse (like a tone signal, a predetermined bit pattern or the like). It rather uses the speech or voice signal itself. A text (e. g. a short sentence,) is spoken by a person and recorded in advance. The text can be in any language that is easy to understand for the operator of the communication system. The language will usually be that of the country in which the quality rating takes place. This has the additional advantage that the operator can immediately check whether the quality rating of the automatic system corresponds to his own opinion.

The test signal is transmitted via the communication system e. g. the mobile radio communication system. However, any speech transmission system (telephone network or the like) may be tested. At the receiving end of the transmission system the test signal is evaluated. This includes extracting characteristic values that are typical for the test signal and that are sensitive to deterioration during transmission (spectral components, variation of energy level, energy distribution in the frequency domain etc.).

The next step comprises determining a differential pattern. I. e. the characteristic values of the received signals are compared with characteristic values of a reference signal. The reference signal may correspond to the test signal transmitted over the same transmission system at a lowest possible distortion level (best transmission available). This optimum signal is evaluated and stored in a memory before performing the present rating method. In practice, the characteristic values of the received test signal are subtracted from predetermined reference values stored in the memory.

The differential pattern is then fed to a neural network. This makes an evaluation of the calculated differential pattern on the basis of those patterns that have been used for training the neural network. The output of the neural network will indicate to which transmission quality class the present test signal belongs. E. g. there are three quality classes (good, medium, bad).

Preferably, the test signal contains several identical samples of spoken text, each sample having a duration in the range of 2 to 15 seconds. If the sample of spoken text is too short, the training of the neural network may be a problem and—as a consequence—the classification is not sufficiently reliable. On the other hand, if the samples are too long, the performing of the method and the tracing of transmission leaks may be unsatisfactory. Since it is advantageous to perform the method during driving a mobile evaluation unit at a certain speed through the test area, it is necessary to limit the time needed for a measurement in order to be able to determine the point of bad reception as exactly as possible.

Usually the neural network will have three outputs corresponding to three quality classes or levels. It may, however, be desired to have a better differentiated classification. According to the invention, this is preferably done by increasing the number of quality classes after the neural network by means of a defuzzyfication logic. The defuzzyfication may increase the number of classes by at least two, e. g. from three to five. As a matter of fact, the evaluation by the neural network will usually not lead to just one output being active but to two or even three outputs being active but one being the most active. Without defuzzyfication logic, the most active output is indicating the rating of the quality. The defuzzyfication logic, however, also takes less active outputs into account and can therefore differentiate e. g. five classes (very good, good, medium, bad, very bad).

The test signal also comprises a synchronization signal. This may consist of at least one chirp signal heading the test signal. The chirp signal may be represented by a frequency sweep from 500 to 1500 Hz. It is worthwhile noting that the synchronization signal is (like the rest of the test signal) in the audible frequency range. For testing bidirectional speech transmission systems, the synchronization signal in one direction is preferably different from that in the opposite direction. In a mobile communication system e. g. the test signal in the downlink may have a downward chirp and the test signal in the uplink an upward chirp. This makes it possible to distinguish between the test directions and to recognize echos.

The test signal may be preprocessed at the receiving end before extracting the characteristic values. The preprocessing may be done by decomposing the signal into a predetermined number of time frames. E. g. a signal of 5 seconds may be decomposed into 100 to 500 frames of 128 to 256 digital samples. The frames may be partially overlapping. This allows evaluating all information available.

The preprocessing may comprise the following steps:
a) Generating digital samples;
b) preemphasizing the digital samples by elevating the higher frequencies;
c) generating overlapping frames of the digital samples.

A set of characteristic values is extracted from each frame and all sets are fed to the neural network. Depending on the number of frames and the number of characteristic values per set, the input of the neural network may consist of several thousands of values.

According to a preferred embodiment, the characteristic values are extracted by spectral analysis of the digital signal samples. The spectral analysis may comprise the steps of:
a) Determining the DFT coefficients for each frame;
b) emphasizing the DFT coefficients;
c) grouping the DFT coefficients into several frequency bands according to the Bark scale (DFT=Discrete Fourier Transform).

These process steps are based on the fact that the human ear can be characterized by appropriate spectral analysis. The human ear is sensitive to the signal energy that is present in particular frequency bands.

An alternative way of extracting characteristic values may comprise the steps of:
a) Determining the auto-correlations function for each frame;
b) calculating the prediction coefficients;
c) determining the cepstrum coefficients.

This method leads to the (smoothed) envelope of the spectrum,. This has the advantage that unexpected loudness variation in the signal can be eliminated by removing the first parameter of the cepstrum sequence.

For some applications (e. g. for rating the transmission quality of analog mobile communication systems) it may be necessary to preclassify the differential pattern. The preclassification may be done by means of a self organizing network (e. g. by a network on the basis of the Kohonen principle). Of course, there are also other means available for dealing with complicated differential patterns. According to a preferred embodiment, the characteristic values are subjected to a data reduction method before feeding the neural network.

An apparatus for automatically and reproducibly rating the transmission quality of a speech transmission system comprises:
a) Means for receiving a test signal transmitted via the speech transmission system, the test signal containing a voice signal;
b) means for extracting characteristic values from the received test signal;
c) means for determining a differential pattern corresponding to the difference between the characteristic values and the predetermined reference values and
d) a neural network that has been trained for classifying differential patterns according to predetermined transmission quality classes.

The main features of the apparatus may be embodied in an electronic circuit for digital signal processing according to the invention. The circuit is used at the receiving end.

At the transmitting end appropriate means for playing back the audible signal may suffice. It is also possible to use an electronic circuit with a memory (ROM) generating the test signal on an electronic level and feeding the test signal directly to an appropriate electronic component of the speech transmission system at the transmitting end.

PREFERRED EMBODIMENTS

Figure 1:
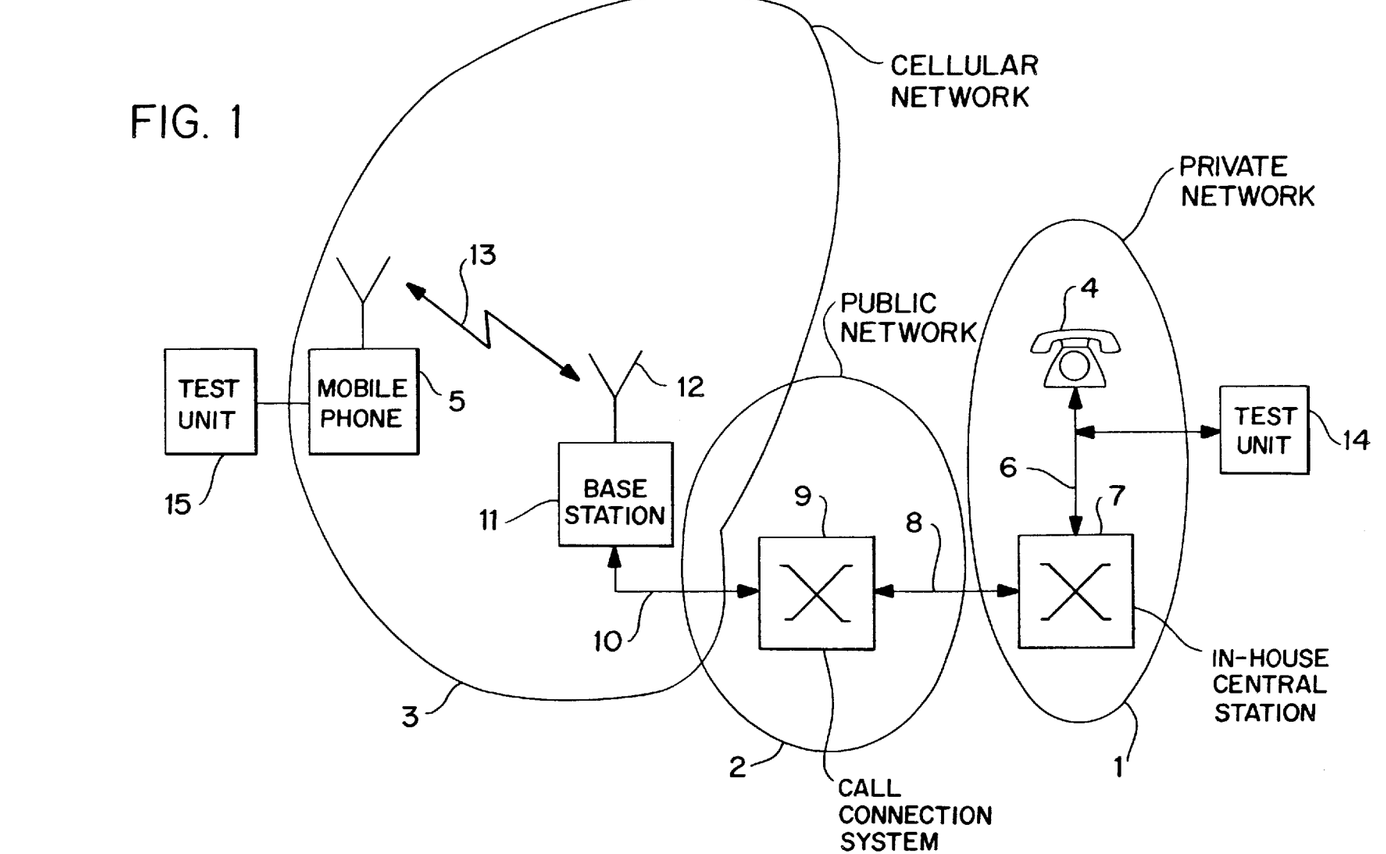
FIG. 1 A block diagram showing the test units and a speech transmission system to be tested.

FIG. 1 exemplifies a speech transmission system consisting of a private network 1 (for example an in-house communication system), a public network 2 and a cellular network 3 (for example a mobile communication system).

A stationary telephone set 4 can therefore communicate with a mobile telephone 5. The communication link comprises a wire link 6 connecting the telephone set 4 with an in-house central station, a wire link 8 connecting the in-house central station 7 with a call connection system 9, a wire link 10 connecting the call connection system 9 with a base station 11 and an antenna 12 for establishing a radio link 13 to the mobile telephone 5.

The most critical transmission section is the radio link 13. Its quality may vary within a wide range. The stationary sections of the speech communication system always have about the same transmission quality.

For checking and rating the transmission quality of the system, two test units 14, 15 according to the invention are used. The test units 14, 15 are preferably identical comprising a transmitting circuit as well as a receiving circuit. The speech transmission system can therefore be checked in both directions (i. e. from the telephone set 4 to the mobile telephone 5—downlink—and from the mobile telephone 5 to the telephone set 4—uplink).

The test units 14, 15 are connected with the system as close as possible to the electro-acoustic transducer (microphone, loudspeaker). The test unit 14 may be plugged into the connector that is normally used for connecting the telephone set 4 to the in-house central station 7. The test unit 15 may be connected to an appropriate input-output of a radio telephone 5. It may also have a circuit similar to that of a mobile telephone in order to be able to receive and demodulate the RF-signals from a base station 11 like a mobile telephone.

Figure 2:
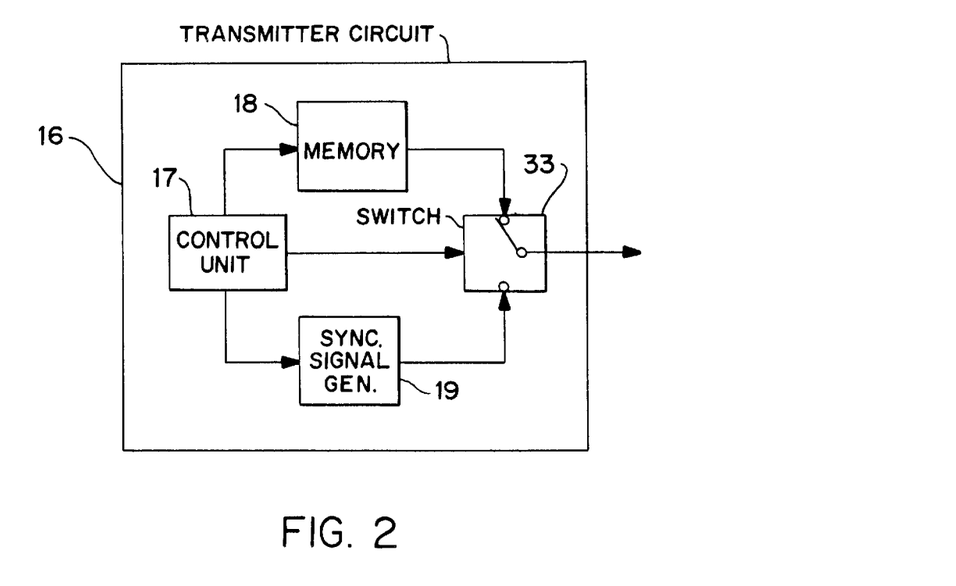
FIG. 2 a schematic block diagram of a circuit for generating and transmitting test signals.

FIG. 2 exemplifies the transmitter circuit 16, which is part of the test units 14, 15. It comprises a control unit 17 monitoring a memory 18 (any sort of ROM or RAM), a Sync signal generator 19 and an output switch 33. The Sync signal generator 19 generates e. g. several chirp signals at the leading end of the test signal. The memory 18 outputs a signal mainly consisting of a recorded voice signal. The text may be a short sentence. It may be spoken by a male or a female voice.

The Sync signals and the actual test signal are combined (output switch 33) and outputted to the speech transmission system.

Figure 3:
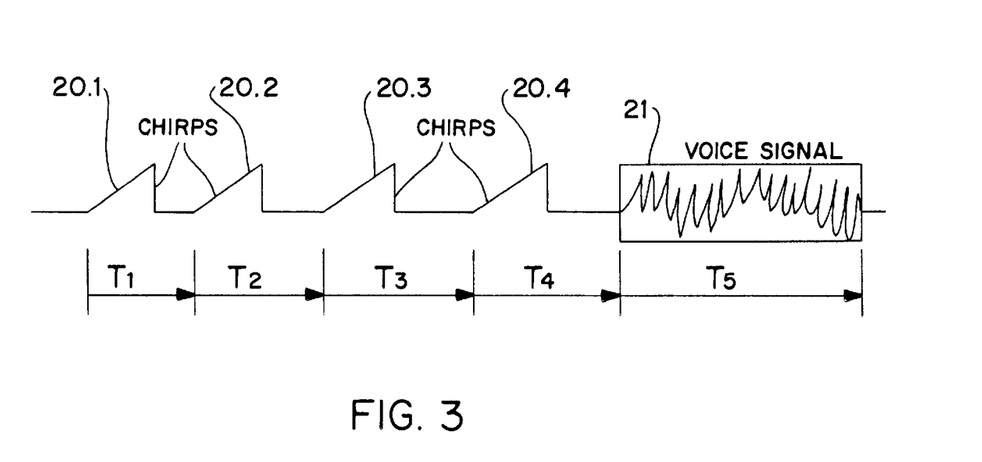
FIG. 3 a schematic diagram of a test signal in the time frequency representation.

FIG. 3 exemplifies the test signal. It comprises a synchronization sequence consisting of several chirps 20.1, . . . , 20.4 and a voice signal 21. The chirps 20.1, . . . , 20.4 are represented by linear frequency ramps. The slope of the ramps may be positive or negative. The chirps 20.1, 20.4 are separated by different time intervals $T_1, \ldots, T_4$. The time intervals $T_1, \ldots, T_4$ are chosen such that recognizing any two of the chirps 20.1, . . . , 20.4 suffices for determining the start time of the voice signal 21. The time intervals $T_1, \ldots, T_4$ can be defined according to a Golomb lineal. A Golomb lineal is characterized by the fact that a number of distances can be measured by a minimum number of subdivisions of the lineal. A Golomb lineal is e. g. a sequence of three intervals having the length of 1, 3 and 2. With this lineal, all distances between 1 and 6 can be measured. According to the invention, a Golomb lineal of length L=17 having the intervals 2, 5, 6, 3, 1 is preferred. With such a lineal, it is possible to measure 15 distances (an interval length of 8 and of 12 can not be measured). A Golomb lineal is much shorter than a binary lineal consisting of the intervals 1, 2, 4, 8, 16. A Golomb lineal with seven marks (consisting of the intervals 2, 5, 8, 6, 3, 1) has the length 25 and can measure 21 distances (the distances 11, 12, 16 and 20 are missing). A corresponding binary lineal would have the length of 63.

The chirps 20.1, . . . , 20.4 may have a duration of e. g. 50 ms and a lower and an upper bound of 500 and 1500 Hz respectively.

Figure 4:
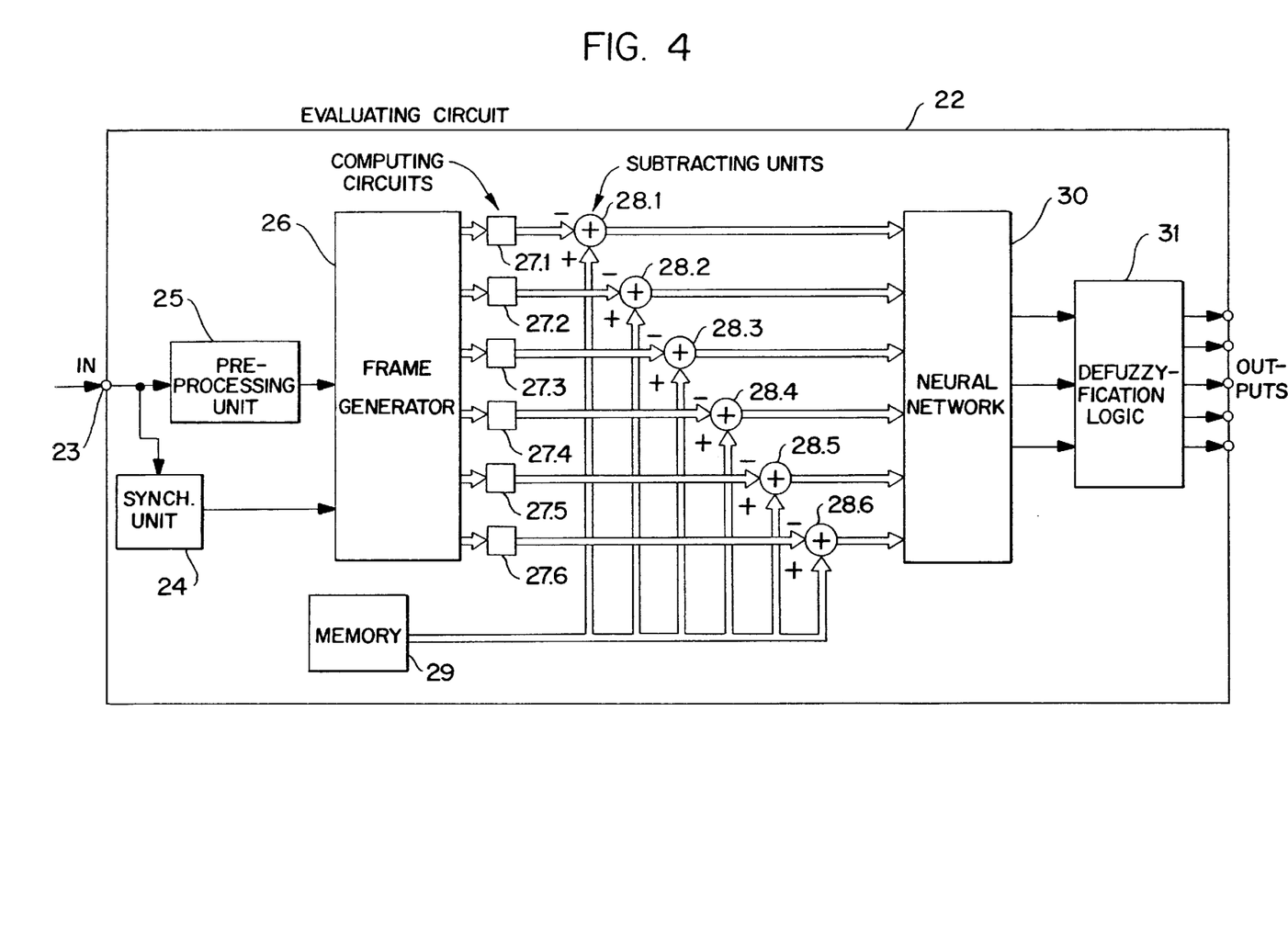
FIG. 4 a schematic block diagram of a circuit for evaluating the test signal.

FIG. 4 shows a simplified block diagram of the receiving and evaluating circuit 22. The input 23 receives a demodulated digital signal in the audible frequency range. In a digital communication system, the input 23 may be connected to the digital output of a demodulator. The demodulator may be part of a standard radio telephone or of a receiving circuit having the function of a standard radio telephone circuit but being part of the test apparatus.

The input 23 is connected to a synchronization unit 24 performing the steps as described below.

The leading synchronization sequence is transformed into a binary signal. This eliminates distortions due to amplitude variations. The binary synchronization signal is correlated and squared (the reason being that the polarity of the incoming signal is not known in advance). The correlation signal will consist of several peaks. A peak of e. g. more than 0.2 in the correlation signal indicates that the synchronization signal has been recognized and that the start time of the voice signal 21 can be determined.

The details of synchronizing a circuit to an incoming chirp signal are known in the art and need no further explanation.

The input 23 is also fed to a preprocessing unit 25. The digital input signal is first limited to A-law level. This type of quantization leads to a high average SNR. It should be noted that speech signals are non-stationary and an optimum performance on the average SNR may be better than maintaining a constant SNR over a wide range or than maximizing the average SNR on specific conditions. Details of A-law quantization are described e. g. in the book "Speech Communication—Human and Machine", Douglas O'Shaugnessy, Addison-Wesley, 1987, pp. 254.

The preprocessing also includes preemphasizing the signal. The A-law quantization also has a certain data reduction effect in so far as the AD converter generates a 16 bit word that is restricted by A-law quantization into a 8 bit word.

The digital signal is first limited to A-law level. It then is preemphasized in a FIR-filter. The preemphasize may consist in elevating the higher frequencies with respect to the lower frequencies in order to emphasize the variations of the signal. According to a preferred embodiment, the FIR-filter for preemphasizing the signal is as follows:

$$Y_k = S_k - a_{k-1} * s_{k-1}$$

$s_k$ is the input sample at the time interval k and $a_{k-1}$ is a positive coefficient slightly smaller than 1 (e. g. $a_{k-1}=0.96$).

The preemphasized signal is fed to a frame generator 26. This block cuts away the synchronization sequence, separates the digitized voice signal into a predefined number of frames (e. g. 200 to 300 frames), each frame comprising 256 signal samples. The offset of the frames with respect to each other is 128 samples (half frame length). Each frame is also weighted by a Hamming window in order to eliminate high frequency side effects from the frame edge. A preferred example of a Hamming window for the present application is $$w_i = a + b * cos\left(\pi * \left(\frac{i-m}{m}\right)\right)$$

$$a = 0.54, b = 0.46$$

$$m = \frac{(L-1)}{2}$$

L is the length of the multiplied vectors.

The effect of the smooth Hamming window is that more energy is concentrated at low frequencies (in contrast to a rectangular time window). Each frame i s the result of a multiplication between a windowing vector $w=(w_1, \ldots, w_L)$ with a signal sample vector. The details of a Hamming window are known in the art (see e. g. Douglas O'Shaugnessy, pp. 211).

The frame generator 26 is synchronized by the synchronization unit 24. It is worthwhile noting that the synchronization has to be very accurate because the signal processing after the frame generator 26 includes subtracting a fixed reference.

Each frame is evaluated by a computing circuit 27.1, . . . , 27.6 (it is evident that the six outputs of the frame genera tor 26 in FIG. 4 are representative for 200 to 300 outputs depending on the number of frames).

According to a preferred embodiment, each computing circuit 27.1, . . . , 27.6 calculates the characteristic values of each frame as follows.

First, the Discrete Fourier Transform (DFT) is calculated to determine the spectral power distribution in the frame. The envelope of the spectral power distribution is a good characterization of the voice signal. Therefore, the prediction coefficients are determined by the well-known LPC algorithm (LPC=Linear Prediction Coding). The coefficients are a prediction of the digital signal samples on the basis of several preceding samples. The calculation of the prediction coefficients is the result of a matrix equation that uses the autocorrelation coefficients of the signal.

The next step comprises smoothing the normalized LPC spectrum. This can be done by using the first few terms of a Fourier series. This type of smoothing an envelope is known in the art.

Finally, the cepstral coefficients are calculated. The result of this calculation corresponds to the envelope of the logarithmic spectral power.

Methods for efficiently calculating the above mentioned coefficients are disclosed in "Digital Processing of Speech Signals", L. R. Rabiner, R. W. Schafer, Prentice Hall Inc., Englewood Cliffs, N.J., 1978, or "Adaptive Digital Filters and Signal Analysis", M. G. Bellanger, Marcel Dekker Inc., New York and Basel, 1987, or "Digital Speech Processing, Synthesis, and Recognition", S. Furui, Marcel Dekker Inc., New York and Basel, 1989, or "Automatische Sprachrekernnung" Arthur Schaub, AGEN-Mitteilungen 52, November 1990, which are included herein by reference.

The next processing step comprises substracting the calculated characteristic values from corresponding reference values stored in a memory 29 (EEPROM, RAM etc.). The subtracting units 28.1, . . . , 28.6 obviously generate a differential pattern consisting of several thousands of values. The differential pattern is fed to a neural network 30. It may be of a known type (e. g. MLP network, MLP=Multi Layer Perception) comprising three layers: an input layer of e. g. 3000 to 8000 neurons, a hidden layer of e. g. 50 neurons and an output layer of preferably 3 neurons. Depending on the differential pattern, one ore more output neurons become active. Since each output neuron stands for one of the available quality classes, it is possible to rate the transmission quality by determining the most active output neuron.

According to a preferred embodiment, the three outputs of the neural network 30 are fed to a defuzzyfication logic 31. The defuzzyfication logic 31 activates one of its five outputs depending on the activation of the output neurons of the neural network 30.

The operation of the defuzzyfication logic can be explained by the following example.

Assume that the neural network 30 has three outputs, namely G (good), M (medium) and B (bad). A fuzzy variable is defined for the quality comprising the sets G, M and B. The output of each output neuron is scaled into a range of 0 to 1. If e. g. the values of the output neurons are within −1 and +1, the scaling may take place by $y_i=0.5(x_i+1)$, wherein $y_i$ is the scaled value and $x_i$ the value of the i-th output neuron.

Figure 5:
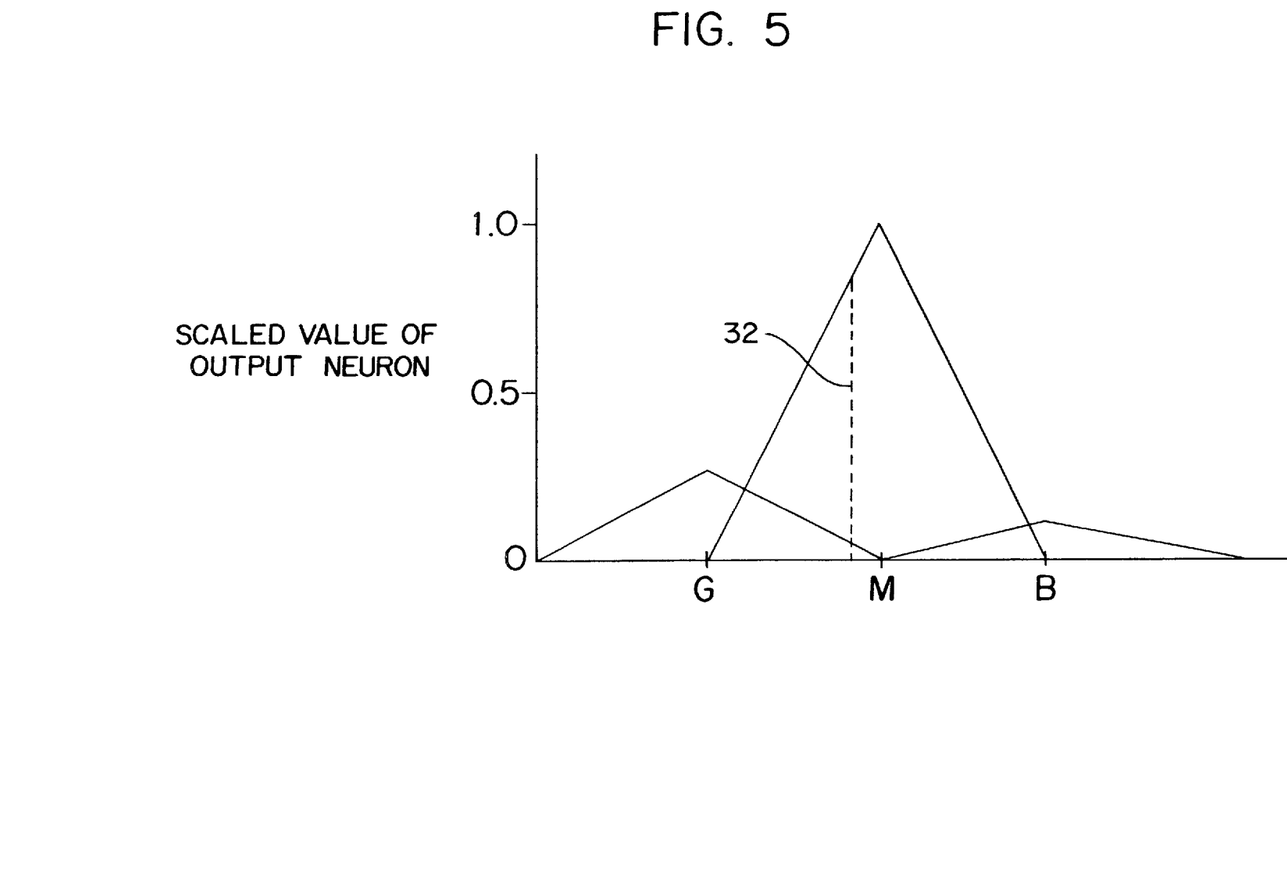
FIG. 5 a schematic diagram exemplifying the defuzzyfication of the output of a neural network.

Then a triangular shaped area is assigned to each scaled value. This is exemplified in FIG. 5. It is assumed that the scaled outputs ot the neural network are the values G=0.25, M=1 and B=0.1. The height and the area of each triangle is proportional to one of the scaled values. The final classification is determined by calculating the center of gravity 32 of the area covered by the three triangles. The final quality rating can be derived from the position of the center of gravity. The range of possible positions may e. g. be subdivided into five classes. Depending on the position of the center of gravity, the appropriate output of the defuzzyfication logic is activated.

The person skilled in the art will meet no problem in using other defuzzyfication methods (see e. g. "Fuzzy Sets", L. A. Zadeh, Information and Control 8, pp. 338–353, 1965).

The neural network has to be trained by appropriate "learing material". The learning material consists of records of transmitted test signals. The transmission quality has to vary within the learing material. The training material is classified by several human experts into three classes: "good", "medium" and "bad". In order to reliably classify the learning material the test signal should have a minimum length of 2 seconds. A preferred length is about 5 seconds.

The training material is preferably classified into only three classes. Even experts may fail when classifying the material into five or more classes. However, if the training material is not adequately classified, the neural network itself will not be able to classify the received test signal in a reliable and reproducible manner. The invention therefore uses the defuzzyfication logic for refining the signal classification.

The neural network can be trained by the wellknown "back propagation" learning. The neural network is fed with the differential pattern at the input and the classification (as determined by a human expert) is applied to the appropriate output neuron, while deactivating the other output neurons. The training material of some hundred good, medium and bad test sequences is enough to classify over 92% of none-training material in accordance with the classification by a human expert. It was found that the network was sufficiently trained after only several dozens of learning cycles.

An MLP network is a wellknown static neural network. It consists of so-called "perceptrons" having n inputs and an output function. The output function can be specified as $$u = f(\Sigma_{i=0 \ldots n}(w_i * v_i))$$

$v_i$ designates the input of the perceptron and $w_i$ the weight of the input. f(.) is a non-linear function such as e. g.

$$f(x) = \frac{1 - e^{-x}}{1 + e^{-x}}$$

(x is the argument of the function).

The MLP network consists of several layers, each having a plurality of perceptrons. The outputs of all perceptrons of one layer are connected with the inputs of the following layer. Networks of this type and other stochastic pattern recognition methods are described e. g. in the book "Neuronale Netze", Rudiger Brause, Teubner, 1991.

The embodiment described above can be modified in different aspects.

An alternative way of extracting characteristic values comprises the steps of dividing the voice signal into e. g. 300 frames (Hamming windows), calculating the fast Fourier transform (FFT) for each frame (thereby generating e. g. 128 frequency values), combining the frequency values according to the so-called Bark scale (defining e. g. 18 critical bands) and defining a so-called "spectrogram" indicating the energy densities at defined times and defined frequencies (twodimensional array). The spectrogram is subtracted from an optimum spectrogram stored in the memory. The Bark scale is based on the physiology of the human ear. It is therefore an appropriate basis for defining characteristic values. The definition of the critical bands is known in the art and is disclosed e. g. in Douglas O'Shaugnessy, pp.150.

It is furthermore possible to insert a data reduction step before the neural network. The characteristic values of the frames may be averaged in a desired way.

The method can be implemented by software on a personal computer. It is of course also possible to implement the method by ASICS.

It is an advantage, if the evaluation circuit is combined with a system for automatically determining the position of the car. It is then possible to drive through the area to be tested while the system automatically receives and qualifies test signals simultaneously determining the location of the car and then storing the quality and the location data together in a memory. The result of the test ride can then be presented on an electronic map making good and bad reception points visible.

Presently preferred embodiments have been shown and described herein. It is not intended that the claims be limited to covering only such preferred embodiments which are meant to be illustrative rather than exhaustive or limiting. Therefore, certain changes and modifications to the preferred embodiments herein and to the operation thereof, should be construed as falling within the spirit and scope of the invention disclosed herein.

What is claimed is:

1. A method for automatically and reproducibly rating the transmission quality of a speech transmission system, comprising the steps of:
    a) Generating a test signal containing a predetermined recorded voice signal;
    b) transmitting the test signal by the speech transmission system from a transmitting end to a receiving end;
    c) extracting characteristic values from the received test signal;
    d) determining a differential pattern corresponding to the difference between the characteristic values and predetermined reference values; and
    e) feeding the differential pattern to a neural network that has been trained for classifying patterns according to a number of predetermined transmission quality classes, wherein the test signal comprises a synchronization signal consisting of at least one chirp signal, and further wherein the chirp signal is generated with different frequency slopes depending on the transmission direction in the bidirectional speech transmission system.

2. Method according to claim 1, wherein the test signal contains several identical voice signals, having a duration of 2 to 15 seconds each.

3. Method according to claim 1, further comprising the step of refining the classification output of the neural network by means of a defuzzyfication logic.

4. Method according to claim 1, wherein the chirp is within the acoustic frequency range.

5. Method according to claim 1, comprising the step of preprocessing the test signal before extracting the characteristic values by decomposing the test signal into a predetermined number of time frames.

6. Method according to claim 5, wherein the preprocessing comprises the steps of:
    a) Generating digital samples;
    b) preemphasizing the digital samples by elevating the higher frequences;
    c) generating overlapping frames of the digital samples; and
    d) extracting a set of characteristic values of each frame.

7. Method according to claim 5, wherein the characteristic values are extracted by spectral analysis of the time frames.

8. Method according to claim 7, wherein the spectral analysis comprises the steps of:
    a) Determining the DFT coefficients for each frame;
    b) emphasizing the DFT coefficients;
    c) grouping the DFT coefficients into several frequency bands according to the Bark scale.

9. Method according to claim 7, wherein the spectral analysis comprises the steps of:
    a) Determining the autocorrelation function of each frame;
    b) calculating the prediction coefficients; and
    c) determining the cepstrum coefficients.

10. Method according to claim 1, further comprising the step of feeding the differential pattern to a data reduction circuit before having it classified by the neural network.

* * * * *